(12) United States Patent
Van Zyl

(10) Patent No.: US 8,258,874 B2
(45) Date of Patent: Sep. 4, 2012

(54) DUAL-MODE CONTROL OF A POWER GENERATOR

(75) Inventor: Gideon Van Zyl, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 29 days.

(21) Appl. No.: 12/650,652

(22) Filed: Dec. 31, 2009

(65) Prior Publication Data

US 2010/0168932 A1  Jul. 1, 2010

Related U.S. Application Data

(60) Provisional application No. 61/141,957, filed on Dec. 31, 2008.

(51) Int. Cl.
 *H03F 3/04* (2006.01)
(52) U.S. Cl. ........................... 330/297; 330/285
(58) Field of Classification Search .................. 330/285, 330/296, 127, 129, 134, 279
See application file for complete search history.

(56) References Cited

U.S. PATENT DOCUMENTS 6,148,220 A * 11/2000 Sharp et al. .................. 455/572

* cited by examiner

*Primary Examiner* — Hieu Nguyen
(74) *Attorney, Agent, or Firm* — Neugeboren O'Dowd PC; Sean R. O'Dowd

(57) ABSTRACT

An improved method and apparatus for managing an application of power with a power generator to a load, the apparatus comprising a power generator configured to apply power to the load; a controller coupled to the power generator, the controller configured to control a plurality of parameters to optimize operational performance of the power system in response to indicia of operational performance of the power system; and a performance assessor, coupled to the power generator and coupled to the controller, the performance assessor configured to provide the indicia of operational performance of the power system to the controller, where the indicia of the operational performance are relative to a plurality of metrics indicative of operational efficiency of the power system.

18 Claims, 10 Drawing Sheets

DUAL-MODE CONTROL OF A POWER GENERATOR

PRIORITY

This application claims priority to expired provisional application No. 61/141,957 entitled METHOD AND APPARATUS FOR CONTROLLING A POWER GENERATOR filed Dec. 31, 2008.

FIELD

The present disclosure relates generally to electrical generators. In particular, but not by way of limitation, the present disclosure relates to methods and apparatuses for managing an application of power with a power generator.

BACKGROUND

Power generators are typically designed to deliver power optimally into a specific load impedance, often referred to as a "reference impedance." Typically, but not always, the reference impedance of power generators is 50 ohms. Operating into a load impedance close to the designed reference impedance typically results in the most efficient operation of the power generator, the highest output power capability, the lowest stress on the components internal to the generator, and zero (or near zero) reflected power (a measure of operational effectiveness) back to the generator from the load.

SUMMARY

Illustrative embodiments of the present disclosure are shown in the drawings and summarized below. These and other embodiments are more fully described in the Detailed Description section. It is to be understood, however, that there is no intention to limit the claims to the forms described in this Summary or in the Detailed Description. One skilled in the art can recognize that there are numerous modifications, equivalents, and alternative constructions that fall within the spirit and scope of this disclosure as expressed in the claims.

One illustrative embodiment includes a power system for applying power to a load comprising a power generator configured to apply power to the load, a controller coupled to the power generator, the controller configured to control a plurality of variable parameters to improve operational performance of the power system in response to indicia of operational performance of the power system, and a performance assessor, coupled to the power generator and coupled to the controller, where the performance assessor is configured to provide the indicia of operational performance of the power system to the controller, and where the indicia of the operational performance are relative to a plurality of metrics indicative of operational efficiency of the power system.

Another illustrative embodiment comprises a method for managing an application of power from a power system to a load, where the method comprises receiving a plurality of performance parameters from a user of the power system, controlling a gate bias voltage relative to a plurality of the received performance parameters, controlling a rail voltage relative to a plurality of the received performance parameters, and adjusting the gate bias voltage and adjusting the rail voltage to improve the operational performance of the power system. These and other embodiments are described in further detail herein.

BRIEF DESCRIPTION OF THE DRAWINGS

Various objects and advantages, and a more complete understanding, of the present disclosure are apparent and more readily appreciated by reference to the following Detailed Description and to the appended claims when taken in conjunction with the accompanying Drawings, wherein:

DETAILED DESCRIPTION

Figure 1:
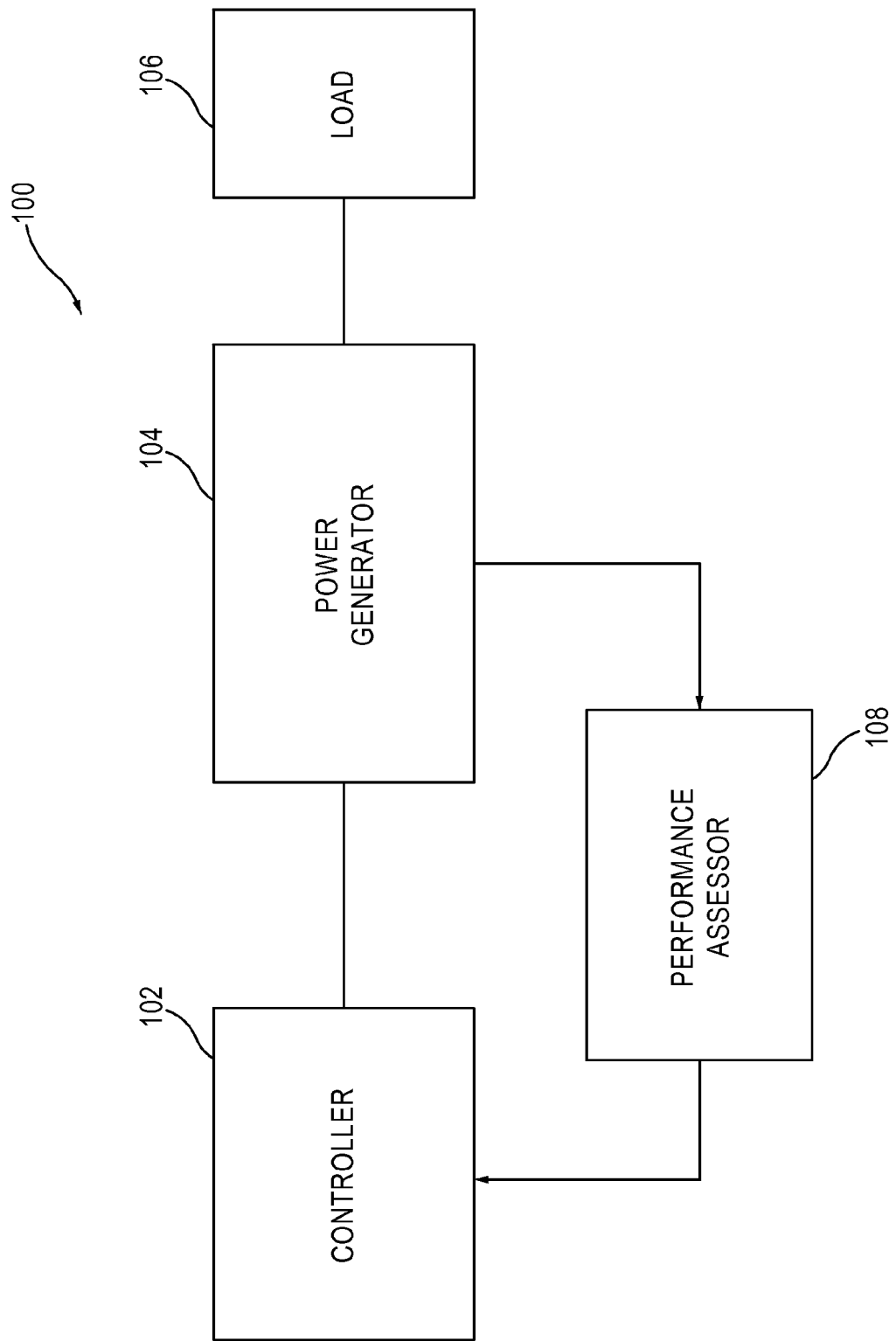
FIG. 1 is a system-level block diagram depicting an exemplary embodiment of the disclosed power generation system coupled to a load.

Reference is now directed to the drawings, where like or similar elements are designated with identical reference numerals throughout the several views.

Referring to FIG. 1, a block diagram of the disclosed power generation system 100 is shown. A controller 102 is coupled to a power generator 104. The power generator 104 is coupled to a load 106. Coupled to the power generator 104 and to the controller 102 is a performance assessor 108. Typically, but not always, some type of matching network (not shown) is used to match the load 106 to the power generator 104. By correct design of the matching network (either internal or external to the generator), it is possible to transform the impedance of the load 106 to a value close to the reference impedance of the power generator 104.

The illustrated arrangement of these components is logical; thus the components can be combined or further separated in an actual implementation, and the components can be connected in a variety of ways without changing the basic operation of the system. For example, the controller 102, the power generator 104, and the performance assessor 108 may be realized by common components and may be within the same housing. Or the controller 102, the power generator 104 and the performance assessor may be implemented and sold separately.

Although not required, the power generator 104 may include a power supply configured to provide a range of power levels and frequencies to facilitate a variety of process applications including etch applications (e.g., silicon, dielectric, metal and strip) and deposition applications (e.g., PECVD, HDP-CVD, PVD, and PEALD). In one variation, the power generator 104 includes a power supply configured to provide power from 30 Watts to 3 kilowatts at frequencies around 13.56 MHz. It is contemplated, however, that the power supply may provide other frequencies and power levels. One exemplary power supply that may be used to realize the power generator 104 is sold under the trade name PARAMOUNT by Advanced Energy Industries, Inc. of Fort Collins, Colo.

Figure 2:
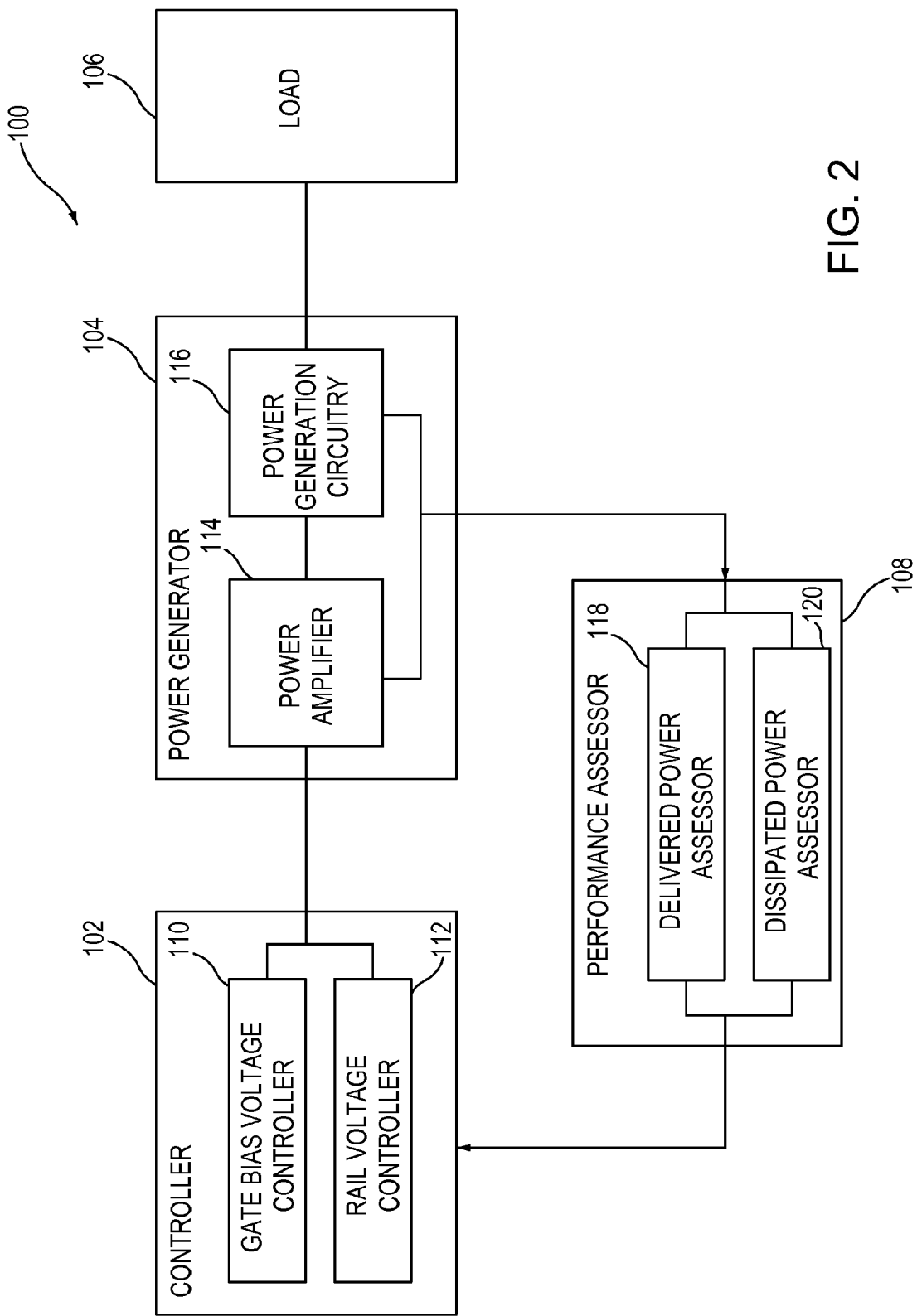
FIG. 2 is a block diagram depicting, in more detail, the exemplary embodiment of the disclosed power generation system of FIG. 1.

FIG. 2 illustrates another embodiment of the disclosed power system. Controller 102 comprises a gate bias voltage controller 110 and a rail voltage controller 112. Power generator 104 comprises a power amplifier 114 and power generation circuitry 116. And performance assessor 108 comprises a delivered power assessor 118 and a dissipated power assessor 120. While not required, the power amplifier 114 may comprise a field effect transistor, or FET. The power amplifier 114 is configured to receive a rail voltage signal, which supplies a DC voltage to the power amplifier 114. The power amplifier 114 is also configured to receive a gate bias voltage signal, which delivers a DC offset value to the power amplifier 114.

The illustrated arrangement of the components in FIG. 2 is logical; thus the components can be combined or further separated in an actual implementation, and the components can be connected in a variety of ways without changing the basic operation of the system. For example, the controller 102, including the gate bias voltage controller 110 and a rail voltage controller 112, the power generator 104, including the power amplifier 114 and power generation circuitry 116, and the performance assessor 108, including the delivered power assessor 118 and the dissipated power assessor 120 may be realized by common components and may be within the same housing. Or the controller 102, including the gate bias voltage controller 110 and a rail voltage controller 112, the power generator 104, including the power amplifier 114 and power generation circuitry 116, and the performance assessor 108, including the delivered power assessor 118 and the dissipated power assessor 120, may be implemented and sold separately.

One method for controlling the power delivered to the load 106 by the power generator 104 includes controlling gate bias voltage. The gate bias voltage delivers a DC offset to the power amplifier 114. In the embodiment of FIG. 2, the gate bias voltage controller 110 performs this function. In typical embodiments, the gate bias voltage may be adjusted more quickly than the rail voltage. For example, in one embodiment, adjusting gate bias voltage from zero percent to 100 percent can be accomplished in approximately 1 microsecond.

Another method for controlling control the power delivered to the load 106 by the power generator 104 includes controlling rail voltage, the voltage at which the power amplifier 114 operates. In the embodiment of FIG. 2, the rail voltage controller 112 performs this function. In typical embodiments, it is difficult to adjust the rail voltage quickly. For example, in one embodiment, adjusting the rail voltage from zero percent to 100 percent can take approximately 2 milliseconds.

In several embodiments, both gate bias voltage and rail voltage are controlled concurrently to better manage the performance of the power system 100. In doing so, the power delivery capability of the power generation system 100 is improved significantly.

For example, a first control loop may be utilized that controls the gate bias to produce the required output power, for example, delivered power or forward power. Alternatively, the first control loop may limit the delivered power at a user-defined maximum power (e.g., maximum reflected power), or at a user-defined maximum current drawn from the DC power supply.

And a second, independent loop may be utilized to adjust the rail voltage to achieve an improved (e.g., optimal) rail voltage. The adjustment of the rail voltage (e.g., to improve and/or optimize the rail voltage) may use a variety of rules, including: (1) maintaining at least a minimum bias value (defined by the user) by dropping the rail voltage if the bias value drops below the desired minimum bias, up to a user-defined minimum rail voltage; (2) maintaining a desired rail voltage (again, defined by the user) if the bias is between a minimum and maximum desired (i.e., user-defined) bias voltage and the power amplifier 114 dissipation is below a maximum desired (user-defined) power amplifier 114 dissipation value; (3) maintaining a maximum desired (user-defined) power amplifier 114 dissipation if the control loop needs to drop the rail voltage below the desired rail voltage in order not to exceed the maximum desired power amplifier 114 dissipation; (4) maintaining a desired (user-defined) bias voltage by manipulating the rail voltage if the power amplifier 114 dissipation is between the desired maximum and absolute maximum (as defined by the user); and (5) maintaining absolute maximum power amplifier 114 dissipation by dropping the rail voltage.

The above-disclosed set of rules for controlling the gate bias voltage and the rail voltage result in an apparatus and method for controlling a power generation system that may use significantly less silicon to achieve a desired (user-defined) power profile and frequency range. The disclosed apparatus and method prolongs the life of devices by operating close to the maximum efficiency. Additionally, the disclosed apparatus and method allow achievement of a very broad power profile and a wider frequency range of operation than what would otherwise be possible. Moreover, the disclosed method and apparatus can, at a given power level, closely maintain a desired rail voltage from which it is easy to change the output power quickly.

Figure 3:
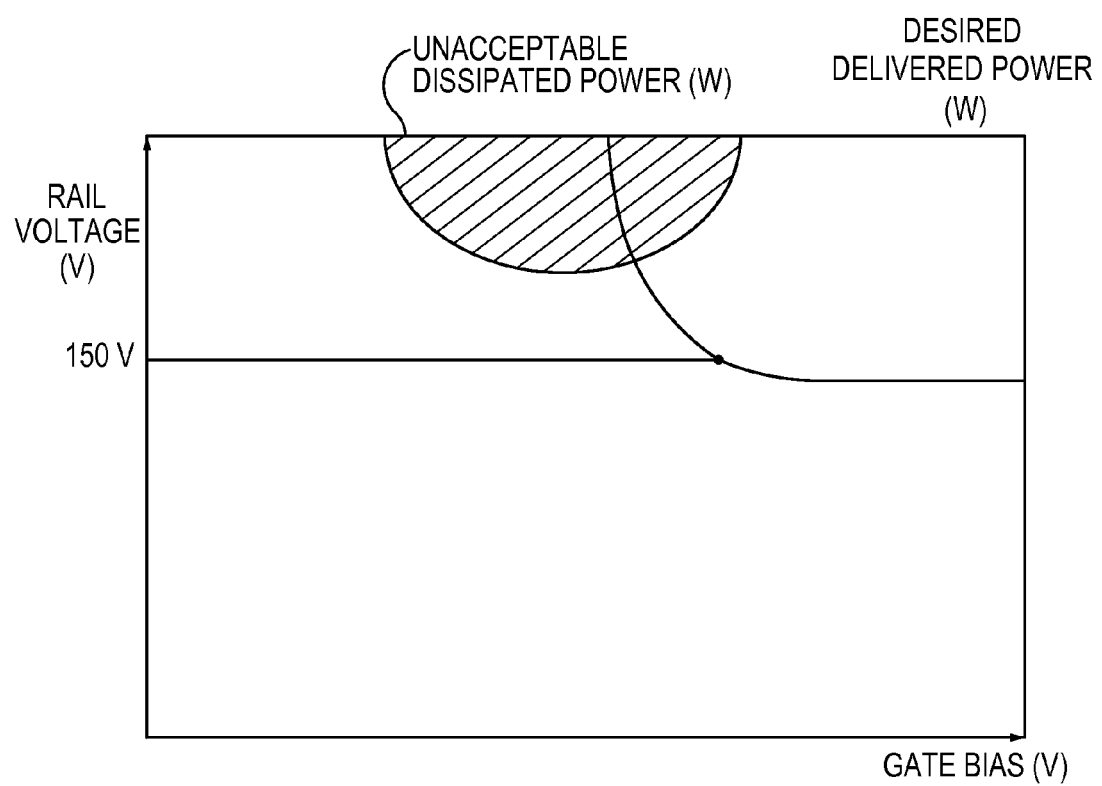
FIG. 3 is a graphical representation illustrating a plurality of relationships between gate bias voltage, rail voltage, power dissipation and delivered power for an exemplary embodiment of the disclosed power generation system.

Depicted in FIG. 3 is a case where the load impedance is such that dissipation of the power amplifier 114 stays below an unacceptable dissipated power level. As illustrated, the loop will keep the rail voltage at a desired value (e.g., 150 V) and simply increase the gate bias until the desired output power is achieved. In this case, the generator 102 can go from zero to full power in approximately one microsecond.

Figure 4:
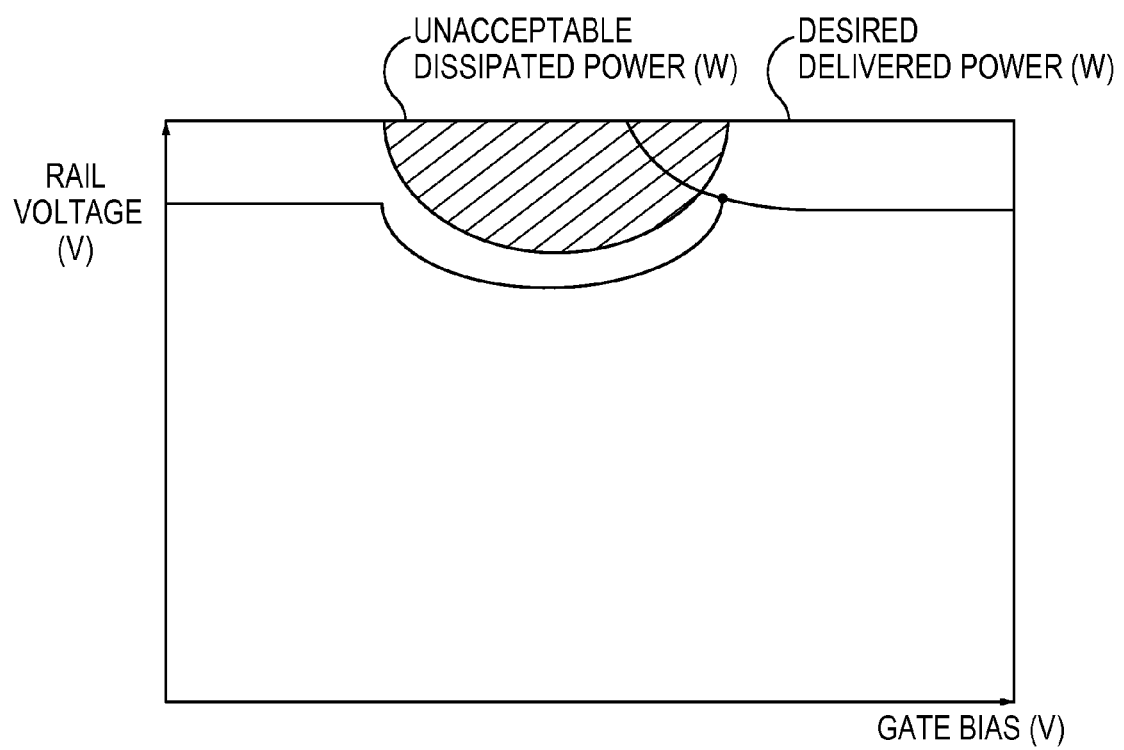
FIG. 4 is another graphical representation illustrating a plurality of relationships between gate bias voltage, rail voltage, power dissipation and delivered power for another exemplary embodiment of the disclosed power generation system.

Dissipation is normally highest when the bias level is such that the generator is around half-power. If the requested power is such that the dissipation is high, the rail voltage control loop, in many modes of operation, will reduce the rail voltage to keep the dissipation under control, as illustrated in FIG. 4.

Optimum efficiency is approximately along a constant high gate bias line. In many modes of operation, the control loop adjusts the rail voltage so that the gate bias stabilizes at this high value while avoiding the range of unacceptable dissipated power. As illustrated in FIG. 4, the rail voltage starts at a high level, but then is adjusted downward to avoid the area of unacceptable dissipated power. The rail voltage ultimately converges at a point where the desired delivered is met.

An additional feature of many embodiments of the disclosed apparatus and method for controlling a power generator is that it ensures that the generator will operate in the same setting (rail voltage, gate bias voltage) every time that the generator is given the same set point for the same load impedance.

Figure 5:
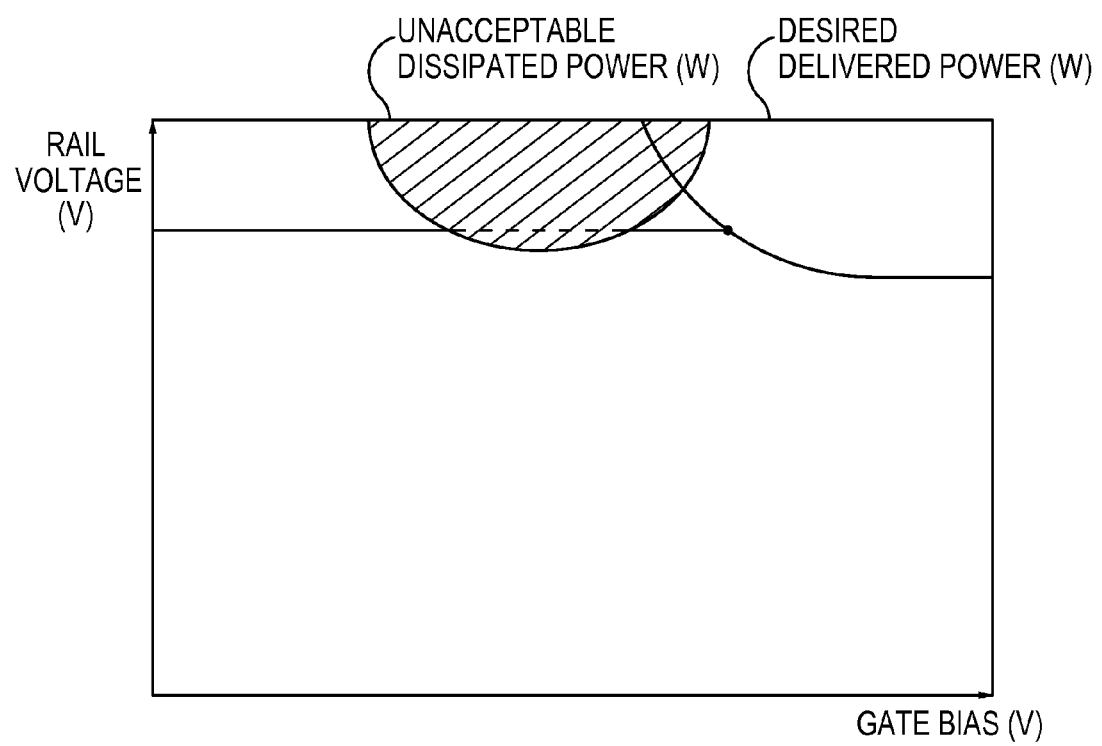
FIG. 5 is another graphical representation illustrating a plurality of relationships between gate bias voltage, rail voltage, power dissipation and delivered power for another exemplary embodiment of the disclosed power generation system.

The gate bias control loop is much faster than the rail voltage control loop. This allows the gate bias loop to "punch through" areas of high dissipation quickly (i.e., sufficiently fast enough to avoid the harmful effects of operating at unacceptably high dissipation levels) if a high output power is requested, as illustrated in FIG. 5. Even though the rail voltage control loop will try to decrease the rail voltage when in the unacceptably high dissipation area, the rail voltage control loop it is too slow, relative to the gate bias control loop, to affect the rail voltage if the generator stays in the high dissipation area for only a short time.

Figure 6:
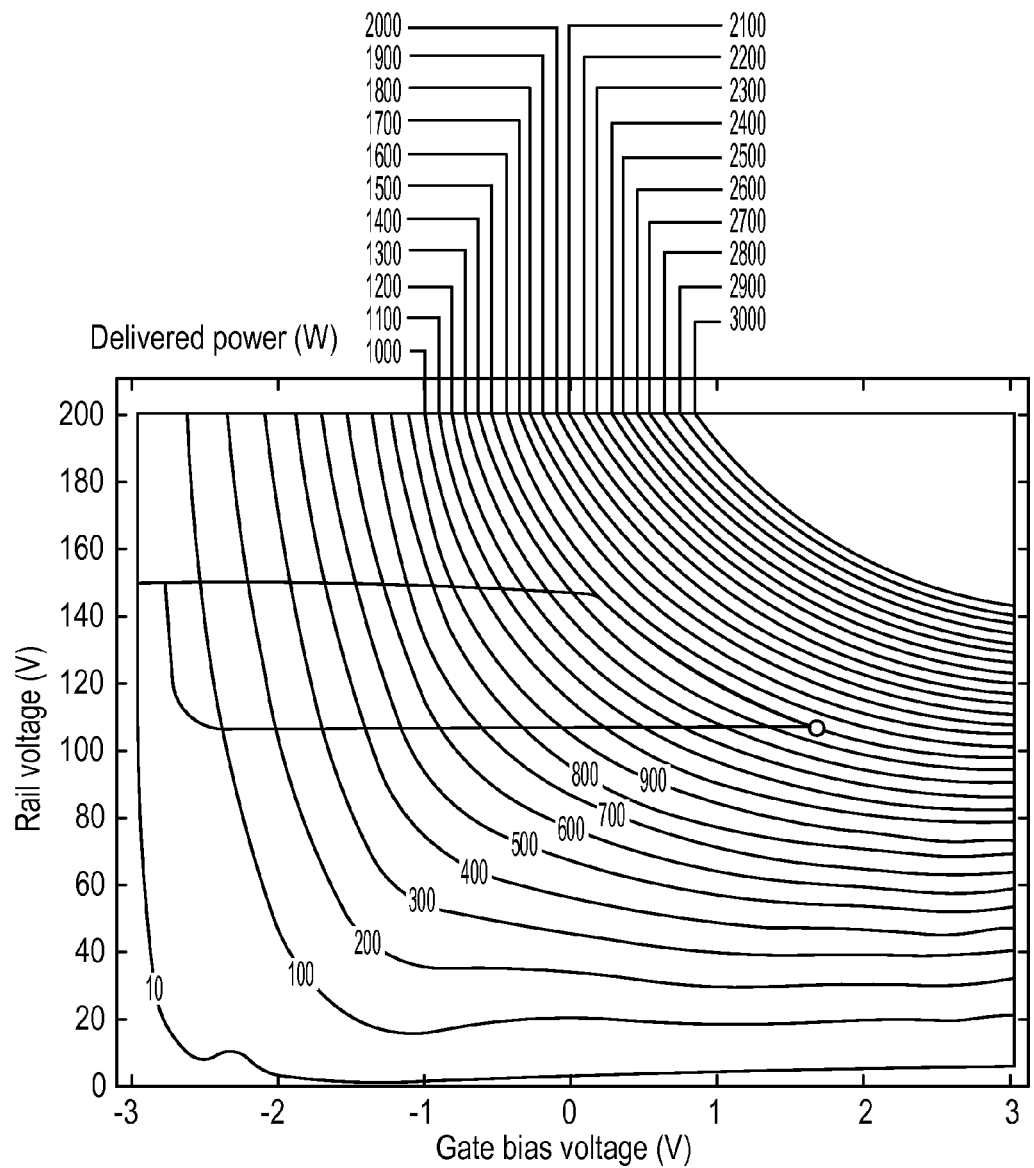
FIG. 6 is a graphical representation illustrating the relationships between gate bias voltage, rail voltage, and delivered power for an exemplary embodiment of the disclosed power generation system.
Figure 7:
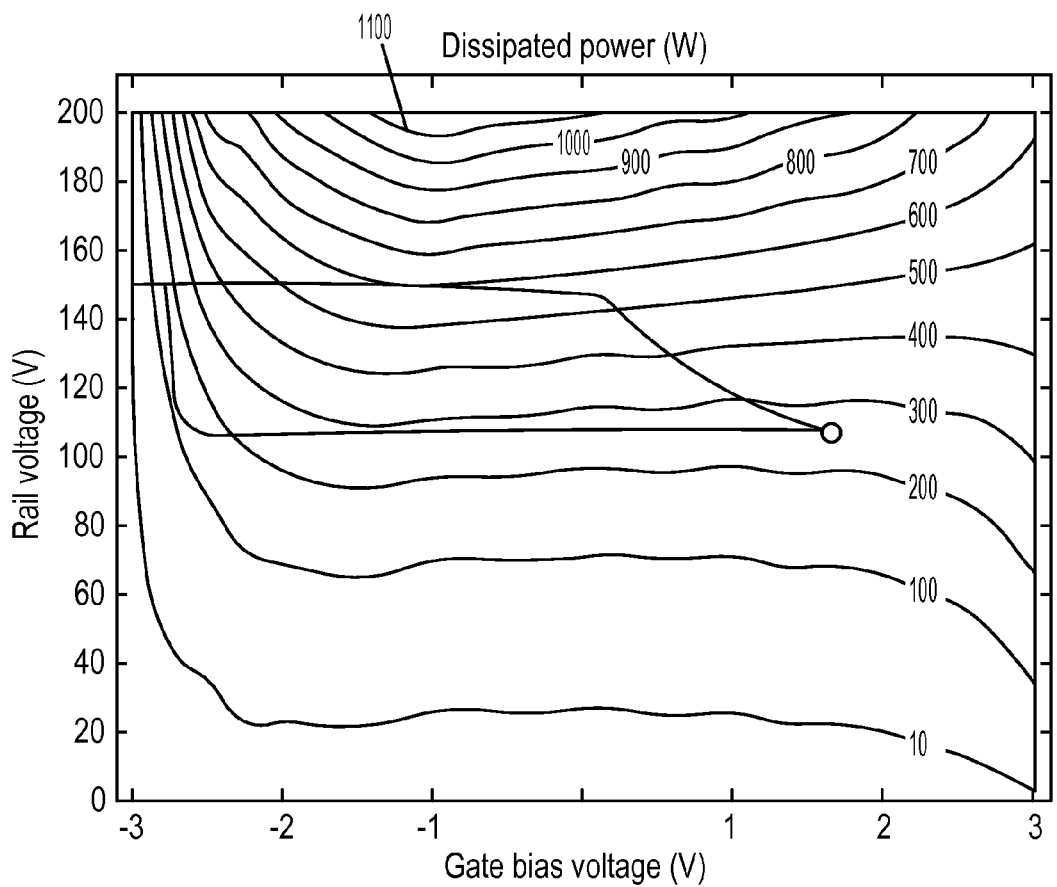
FIG. 7 is a graphical representation illustrating the relationships between gate bias voltage, rail voltage, and dissipated power for the exemplary embodiment of the disclosed power generation system.

FIGS. 6 and 7, viewed together, provide additional insight into the operation of the disclosed system and method. In general there is a continuum of solutions to achieve a desired output power. For example, looking at FIGS. 6 and 7 together, it is apparent that 1 kilowatt delivered power can be produced at the three points listed.

TABLE 1

Illustrating a Continuum of Solutions

| Bias | Rail voltage | Delivered power | Dissipated power |
|---|---|---|---|
| −1 | 200 | 1000 | 1100 |
| 0 | 110 | 1000 | 300 |
| 3 | 80 | 1000 | 250 |

The trajectories, shown in FIGS. 6 and 7, illustrate how the control loops adjust the power between 50 W and 1500 W. Starting from the very left point, the bias voltage is increased rapidly until 1500 W is achieved at 0.5 V gate bias and 150 V rail voltage. Notice that rail voltage is slightly below 150 V rail because, in this example, the desired dissipation is set at 250 W, so the rail voltage is decreased a bit. Once the generator is at 1500 W, the rail voltage control loop decreases the rail voltage to attempt to get to the desired dissipation of 250 W and the desired gate bias of 2.5 V (it does not achieve the latter objective). When the power set point is changed to 50 W, the bias voltage is again rapidly decreased until the output power is 50 W. At this point the rail voltage is increased back to the desired 150 V.

In operation, embodiments of the disclosed control system comprise two control loops (gate bias and rail voltage) to achieve the desired objective. The gate bias control loop (fast loop) looks at the delivered power, and at two protection parameters that require high speed control: reflected power and supply current. This control loop adjusts the gate bias to achieve the desired power (also referred to as "set point") subject to the condition that the reflected power and supply current remain below their (user-defined) maximum limits.

In the gate bias control loop, if operation is below the set point and below any of the limiting values, the bias voltage will be increased until operation reaches the set point. Otherwise the control loop will decrease the gate bias voltage until operation of the power system is at the set point or at the defined maximum reflected power or at the maximum drain current. Once at least one of those conditions is met, the gate bias control loop stops operation unless there is a change in operational condition of the system.

Figure 8:
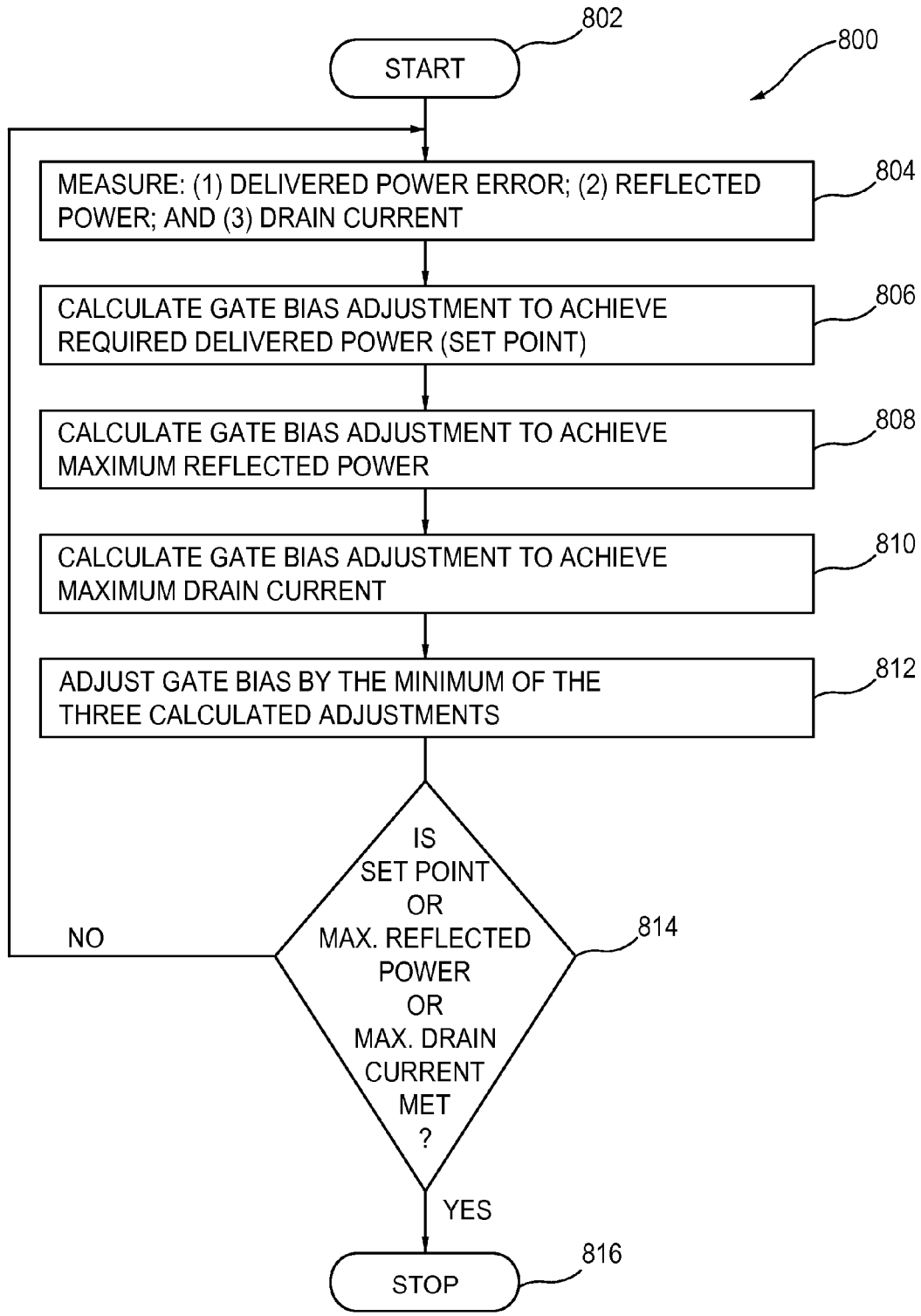
FIG. 8 is a flow diagram depicting a method for controlling power delivered by the disclosed power generation system.

FIG. 8 is a flow diagram illustrating the method for controlling gate bias voltage. The method of control loop 800 begins at block 802. Next at block 804, three parameters are measured: the difference between the delivered power and the desired delivered power, also referred to as the "delivered power error;" the reflected power; and the drain current. At block 806 an adjustment to the gate bias voltage is calculated, based on the measured delivered power error, to achieve required delivered power. At block 808 an adjustment to the gate bias voltage is calculated, based on the measured reflected power, to achieve the maximum reflected power. At block 810 an adjustment to the gate bias voltage is calculated, based on the measured drain current, to achieve the maximum drain current. The desired delivered power, maximum reflected power and maximum drain current are set by the user (not shown) prior to operation of the power generation system. At block 812 the three adjustments calculated in blocks 806, 808 and 810, are compared, and the calculated adjustment having the smallest magnitude will be implemented. At branch 814, the method determines whether one (or more) of the desired delivered power (or set point), maximum reflected power or maximum drain current are met. If so, the method stops at block 816. If not, then the method returns to block 804 to go through the control loop again.

The second, rail voltage loop (slow loop) handles the dissipation limit loop and acts as an optimizer, trying to achieve as close as possible to the desired rail voltage, desired gate bias voltage and desired dissipation. It receives three inputs: (1) the gate bias voltage (which is controlled by the fast loop); (2) the dissipated power; and (3) the previous value of the rail voltage.

This method optimizes the rail voltage to try to achieve: (1) no more than the maximum dissipation; (2) preferably no more than the minimum dissipation; (3) a bias voltage (as set by the first loop); (4) a minimum bias value; and (5) a minimum rail voltage.

Figure 9:
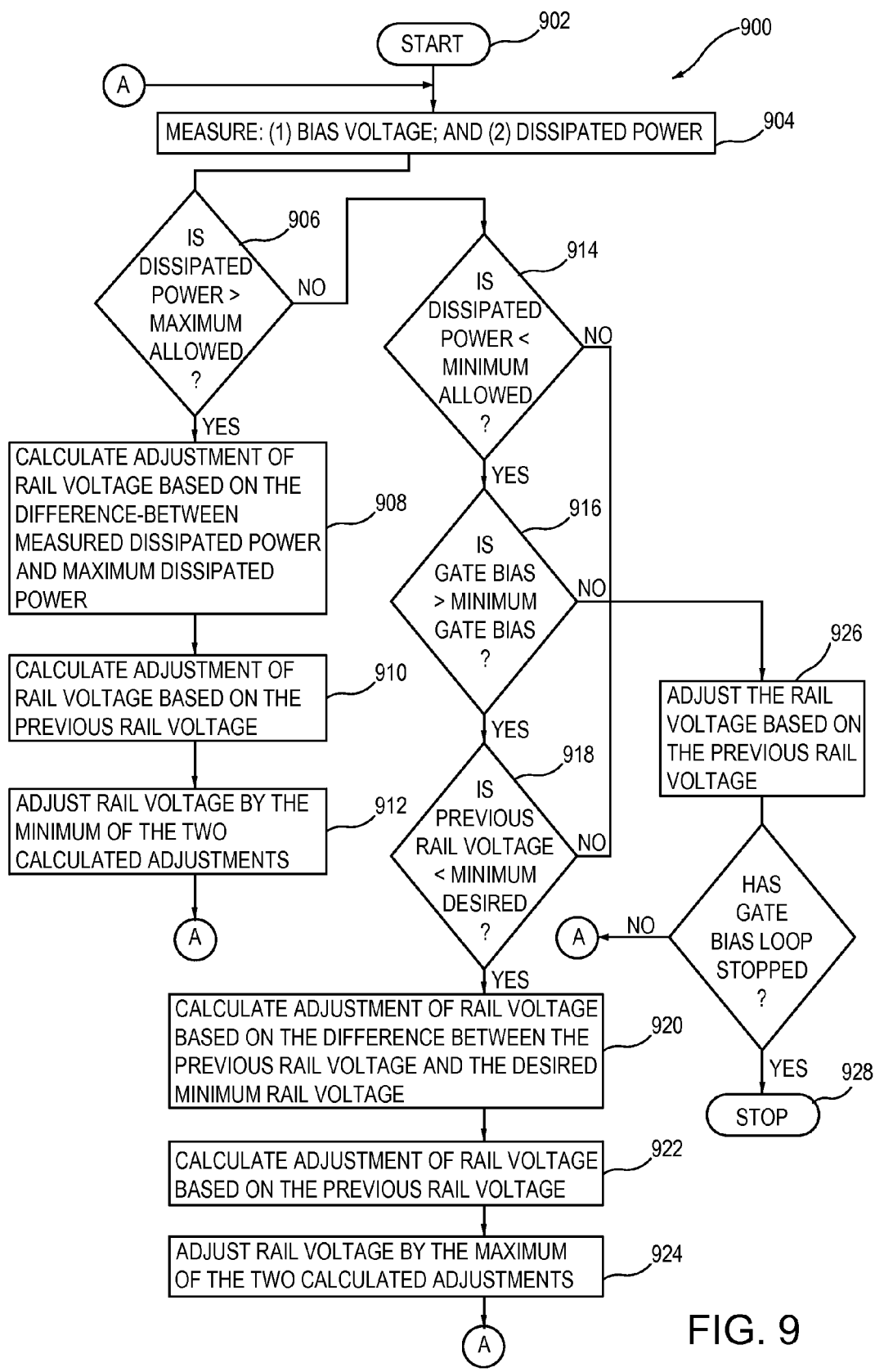
FIG. 9 is another flow diagram depicting a method for controlling power delivered by the disclosed power generation system.

FIG. 9 is a flow diagram illustrating the method for controlling rail voltage. The method of control loop 900 begins at block 902. Next at block 904, two parameters are measured: the gate bias voltage, and the dissipated power. At branch 906 the control loop determines whether the dissipated power is greater than the maximum allowed dissipated power (an unacceptable condition, except for short periods of time). If the dissipated power is greater than the maximum dissipated power allowed, then the control loop progresses to block 980 where an adjustment to the rail voltage is calculated based on the difference between the measured dissipated power and the maximum allowed dissipated power. At block 910 an adjustment to the rail voltage is calculated, based on the previous value of the rail voltage. At block 912 the two adjustments calculated in blocks 908 and 910 are compared, and the calculated adjustment having the smallest magnitude will be implemented.

If at branch 906, the dissipated power is not greater than the maximum allowed dissipated power, then the control loop progresses to branch 914. At branch 914, the control loop determines whether the measured dissipated power is less than the minimum allowed dissipated power. If it is, the control loop progresses to branch 916 and determines whether the gate bias is greater than the minimum allowed gate bias. If it is, then the control loop progresses to branch 918 to determine whether the previous rail voltage is less than the minimum desired rail voltage. If it is, then the control loop progresses to block 920 to calculate an adjustment to the rail voltage based on the difference between the previous rail voltage and the desired minimum rail voltage. The control loop next progresses to block 922 where it calculates an adjustment to the rail voltage based on the previous rail voltage. Next, in block 924, the control loop compares the two calculated adjustments and implements the larger of the two.

If any of branches 914, 916 or 918 are answered in the negative, then the control loop progresses to block 926 whereby the rail voltage is adjusted based simply on the previous value of the rail voltage.

Figure 10:
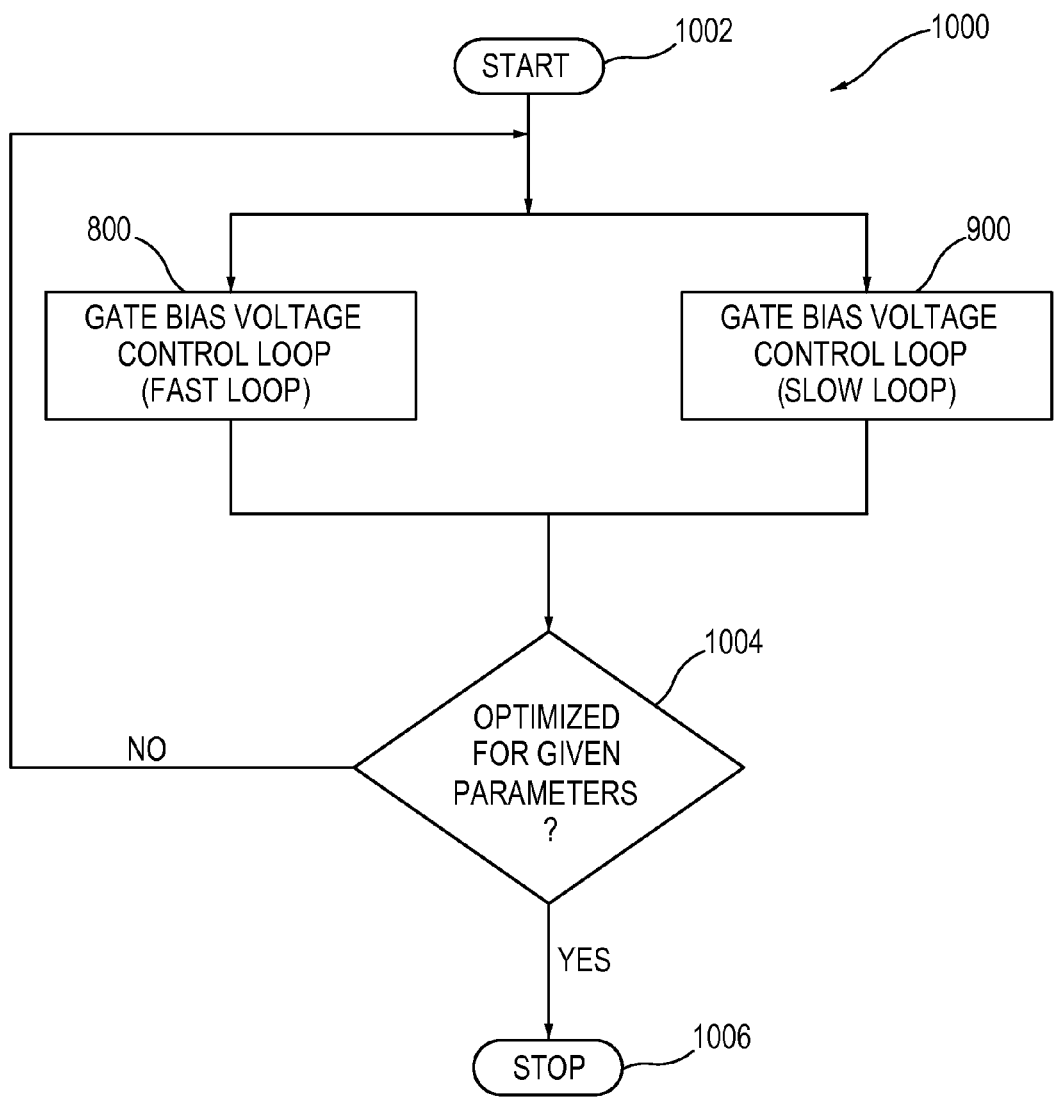
FIG. 10 is another flow diagram depicting a method for controlling power delivered by the disclosed power generation system.

Finally, as depicted in FIG. 10, a method for controlling the power generation system 1000 is illustrated. The method begins at block 1002, and then branches to blocks 800 and 900 concurrently. Block 800 corresponds to the method for controlling gate bias voltage as described above and depicted in FIG. 8. Block 900 corresponds to the method for controlling rail voltage as described above, and as depicted in FIG. 9. At branch 1004, the method determines whether the power generation system is presently optimized for the given performance parameters, as established by the user, under the present circumstances. If the power generation system is optimized for the given performance parameters, then the method stops at block 1006. If the power generation system is not optimized, then the method branches out from block 1004 to return to the beginning of the method to repeat the steps accordingly until such time that the power generation system is operating at the desired operational parameters.

In conclusion, the present application discloses, among other things, a system, an apparatus and a method for controlling the application of power with a power generator. Those skilled in the art can readily recognize that numerous variations and substitutions may be made in the disclosure herein, its use, and its configuration to achieve substantially the same results as achieved by the embodiments described herein. Accordingly, there is no intention to limit the claims to the disclosed exemplary forms. Many variations, modifications, and alternative constructions fall within the scope and spirit of the present disclosure as expressed in the claims.

What is claimed is:

1. A power system for applying power to a load, comprising:
    a power generator configured to apply power to the load based upon a power set point that is indicative of a level of power to be applied to the load;
    a controller coupled to the power generator, the controller configured to control a rail voltage signal and a gate bias signal, where the controller controls both the rail voltage signal and the gate bias signal to maintain the power set point, and also improve operational performance of the power system in response to indicia of operational performance of the power system, and the controller increases the gate bias signal to maintain the power set point when the level of the power that is applied to the load drops below the power set point; and
    a performance assessor, coupled to the power generator and coupled to the controller, the performance assessor configured to provide the indicia of operational performance of the power system to the controller, where the indicia of the operational performance are relative to a plurality of metrics indicative of operational efficiency of the power system.

2. The power system of claim 1 wherein the power generator comprises a power amplifier configured to receive the rail voltage signal and to receive the gate bias signal.

3. The power system of claim 2 wherein the power amplifier comprises a field effect transistor.

4. The power system of claim 2 wherein the controller delivers the rail voltage signal and the gate bias voltage signal to the power amplifier.

5. The power system of claim 1 wherein the controller comprises a gate bias voltage controller and a rail voltage controller.

6. The power system of claim 1 where the plurality of metrics indicative of operational efficiency of the power system comprise delivered power and dissipated power.

7. The power system of claim 1 wherein one of the plurality of metrics indicative of operational efficiency of the power system is selected from the following group of metrics: delivered power, forward power, reflected power, minimum reflected power, maximum delivered power, and current drain from a DC power supply, and another of the plurality of metrics indicative of operational efficiency of the power system is dissipated power.

8. The power system of claim 1 wherein the controller is further configured to receive user input indicative of a desired performance parameter.

9. The power system of claim 1 wherein the controller is further configured to receive user input indicative of a plurality of desired performance parameters.

10. A power generation system for applying power to a load, comprising:
    a power generator configured to apply power to the load, the power generator including a power amplifier configured to receive a rail voltage signal and to receive a gate bias signal;
    a controller coupled to the power generator, the controller configured to control both the rail voltage signal and the gate bias voltage signal to the power amplifier to reach and maintain a power set point, the controller further configured to optimize, while maintaining the power set point, operational performance of the power system in response to a set of indicia of the operational performance of the power system, and the controller increases the gate bias voltage signal to maintain the power set point when the level of the power that is applied to the load drops below the power set point; and
    a performance assessor, coupled to the power generator and coupled to the controller, the performance assessor configured to deliver the set of indicia of the operational performance of the power system to the controller, where the indicia of the operational performance comprise a plurality of metrics indicative of operational efficiency of the power system.

11. The power generation system of claim 10 wherein the power amplifier comprises a field effect transistor.

12. The power generation system of claim 10 wherein the controller comprises a gate bias voltage controller and a rail voltage controller.

13. The power generation system of claim 10 wherein the controller is further configured to receive user input indicative of a desired performance parameter.

14. A method for managing an application of power from a power system to a load, the method comprising:
    receiving a plurality of performance parameters from a user of the power system;
    receiving a set point for a particular power level to be applied to the load;
    controlling a gate bias voltage and a rail voltage to reach and maintain the particular power level while optimizing operational performance of the power system relative to the plurality of the received performance parameters; and
    increasing the gate bias voltage to maintain the particular power level applied to the load when the power that is applied to the load drops below the particular power level.

15. The method of claim 14 wherein receiving a plurality of performance parameters from a user of the power system comprises receiving required delivered power, maximum reflected power, and maximum drain current.

16. The method of claim 15 wherein controlling a gate bias voltage relative to a plurality of the received performance parameters further comprises:
- measuring delivered power, reflected power and drain current;
- calculating a first gate bias adjustment to achieve the required delivered power;
- calculating a second gate bias adjustment to achieve the maximum reflected power;
- calculating a third gate bias adjustment to achieve a maximum drain current; and
- adjusting the gate bias voltage by the minimum of the first, second and third calculated gate bias adjustments.

17. The method of claim 16 wherein receiving a plurality of performance parameters from a user of the power system comprises receiving maximum dissipated power, minimum dissipated power, minimum gate bias voltage, and minimum rail voltage.

18. The method of claim 17 wherein controlling a rail voltage relative to a plurality of the received performance parameters further comprises:
- measuring the gate bias voltage and measuring a dissipated power;
- comparing the measured dissipated power with the maximum dissipated power, and if the measured dissipated power is greater than the maximum dissipated power, then:
- calculating an adjustment of the rail voltage based on the difference between the measured dissipated power and the maximum dissipated power;
- calculating an adjustment of the rail voltage based on the previous rail voltage; and
- adjusting the rail voltage by the minimum of the two calculated adjustments.

* * * * *